March 17, 1970     W. G. DOW ETAL     3,501,376
METHOD AND APPARATUS FOR PRODUCING NUCLEAR FUSION
Filed July 21, 1967     3 Sheets-Sheet 1
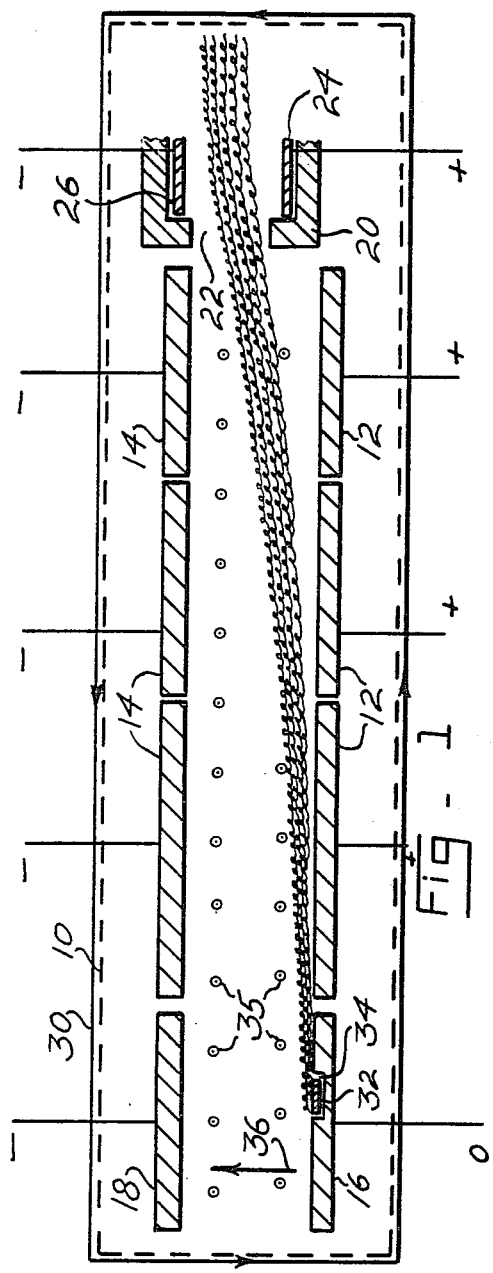
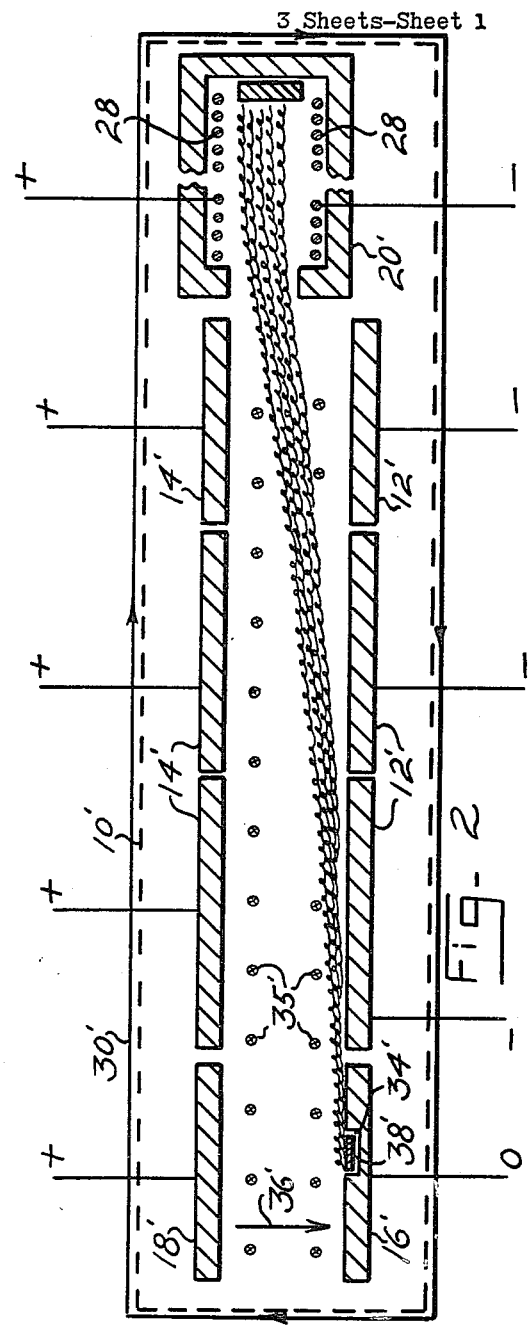
INVENTORS
William G. Dow
Irving E. Pozian
BY Beaman & Beaman
ATTORNEYS

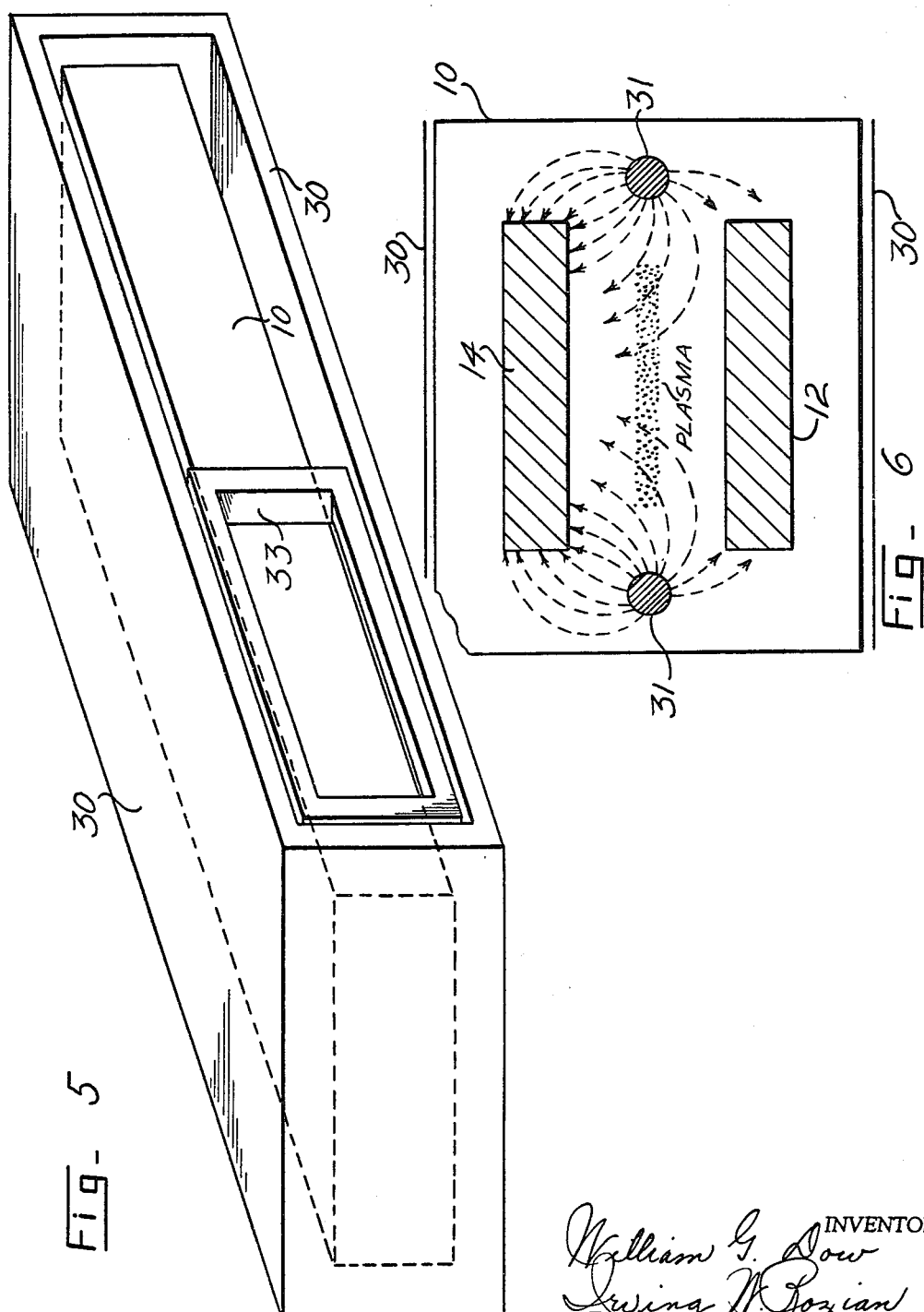

United States Patent Office 3,501,376
Patented Mar. 17, 1970

3,501,376
METHOD AND APPARATUS FOR PRODUCING NUCLEAR FUSION
William G. Dow, Ann Arbor, and Irving W. Rozian, Plymouth, Mich., assignors to Consumers Power Company, Jackson, Mich., a corporation of Maine
Filed July 21, 1967, Ser. No. 655,114
Int. Cl. G21b 1/00; H05h 1/00
U.S. Cl. 176—1
8 Claims

ABSTRACT OF THE DISCLOSURE

A method and apparatus for the generation of largely rotational kinetic energies of high magnitude in a slowly-drifting stream of electrically charged particles of one electrical polarity only in which the direct-current space-charge forces are neutralized by the combined action of crossed direct-current electric and magnetic fields, such a high kinetic energy stream being herein called a monopolar, crossed-field-neutralized plasma, and when using ion particles the generated kinetic energy may be used in producing nuclear fusion due to collisions of the particles, or when using electrons the created energy is usable for electronic purposes.

BACKGROUND OF THE INVENTION

The field of the invention relates primarily to the generation of energy resulting from imparting high kinetic velocity and energy to charged particles.

In the art of energy generation, it is known to create energy, primarily heat, by splitting a heavy atomic nucleus into two or more fragments. Such a process is well known as nuclear fission, and is currently being used in a number of power-generating applications, wherein the heat produced by the fission process is used to heat water and produce steam for driving turbines.

Nuclear fusion pertains to the release of energy when very light nuclei fuse into heavier elements. This process is used in the principle of the hydrogen bomb. Current nuclear energy-generating systems utilize a fission process, in that the reaction of this type of nuclear energy-producing system may be more easily regulated and controlled than a fusion process. Since the neutron has no electrical charge, it experiences no force of repulsion as it approaches the positively charged nucleus. Thus, a fission reaction may be started and sustained at room temperature.

The control and sustaining of a nuclear fusion process has in the past been most difficult in view of the great amounts of energy input required per particle to initiate the reaction. Additionally, the electrical forces of repulsion between two like charges becomes very great before two protons can be fused together, due to the like charge of the protons. When the protons can ultimately be brought close enough together, a short-range nuclear binding force is produced which pulls the protons together with a net yield of energy. It has heretofore been necessary to maintain and produce a very high temperature environment utilizing great amounts of energy in order to form and maintain nuclear fusion and, due to the problems attendant with producing such high temperatures, little or no success has heretofore been enjoyed toward the successful utilization of fusion to produce usable energy.

SUMMARY OF THE INVENTION

It is the concept of the invention to produce an environment in which charged particles can be endowed with sufficient kinetic energy, and with such control, that the creation of a usable energy force occurs. Included in the concept of the invention is to provide an environment wherein nuclear fusion can be produced and controlled for the purpose of utilizing the energy created by the fusion reaction.

The practice of the invention includes the method of generating very high kinetic energies of electrically charged particles, and of confining the motions of the particles wherein the energy produced may be utilized in several different applications. In the environment in which the inventive concept takes place there is present particles pirmarily of one electrical polarity only, with essentially no neutral gas particles present. The movement of the particles in the concept of the invention produces high kinetic energies because of the ordered and/or thermally random motions of the particles that are largely rotational in planes perpendicular to a direct current applied magnetic field crossed with an applied electric field. The high kinetic energy motions are superposed on particle drift motions primarily at right angles to the crossed direct current fields, the kinetic energy of the drift motions being a small proportion of the total particle kinetic energy.

Basically, the method of the invention consists of the steps of maintaining, in a region of extremely low neutral gas pressure, a direct current electric field due either to potentials between electrodes or to potential gradients in a conducting gas region, or similar means, and also producing a direct current magnetic field having a strong component at right angles to the electric field, and then causing there to be present in this region a monopolar stream of electrically charged particles and permitting this stream to pass through the crossed electric and magnetic fields. The motion of the particles due to drift will be relatively slow, as is known, and will be approximately at right angles to both fields. This flow is a quasi-brillouin flow, and is confined by the crossed field forces. The magnitude of the crossed electric and magnetic fields is such with respect to one another and the geometry of the environment as to cause the appearance in the confined stream some random, and in many cases partially ordered rotational particle movement about magnetic flux lines. The kinetic energies of such motions greatly exceed the kinetic energy of the particle drift motion at right angles to the crossed direct current fields, and the stream thus becomes a monopolar crossed field-neutralized plasma in which the high energy of the rotational and partially random motions are derived. The energy is produced by the crossed-field interaction from the potential energy acquired from a component of charged particle motions along the electric field lines. The monopolar plasma stream possesses direct-currents space-charge properties similar to brillouin flow but with added high energy motions which tend to diverge the flow to some degree. However, the monopolar plasma stream is almost entirely confied to a laterally limited quasi-brillouin flow partly by the forces of the crossed direct-current electric and magnetic field forces, which prohibit high-energy particles from wandering substantially in a direction lateral to the average drift motions, confinement for motions in the direction along magnetic flux lines being accomplished by side electrodes at potentials repelling the particles, or by employing a geometry and magnetic flux paths which are re-entrant.

It is the concept of the invention that charged particles of like polarity be confined in an environment and that under such conditions the particles form a plasma which can be so controlled and oriented that many-direction motions of the particles can be produced at high kinetic energies wherein quantum mechanical principles become effective to the point that particles of like charge can "tunnel" through the natural replusion barrier without having to overcome the barrier. While the probability of "tunneling" is very small at low energies, it becomes much greater as the barrier energy is produced. Additionally, in the practice of the invention, the particles of the plasma are exposed to a magnetic flux field while simultaneously being influenced by space-charge-wave motions which result in a particle movement of an overlapping-loop trochoidal motion which substantially increases the likelihood of collision between the particles of the plasma. The particles of the plasma in accord with the invention have high velocities imparted thereto and very close approaches of the particles, when ion particles are employed, can cause a fusion reaction sufficient to sustain a net yield of fusion energy.

The streams of charged particles described herein are called plasma streams, or plasmas (monopolar plasmas) because they possess certain characteristics in common with the more familiar bipolar plamas, including the following attributes:

(a) The energy of directed stream-flow motion of the charged particles is very small relative to energies of their randomly-directed, or rotational, or many-direction, motions.

(b) The direct-current space-charge forces are neutralized, in the monopolar plasma, by the presence of strong direct-current crossed electric and magnetic fields, thus preventing the rapid diverging of the stream that space-charge forces would otherwise produce; in bipolar plasmas opposite charges neutralize the space-charge forces.

(c) There exist in the streams "plasma oscillations" at ultra-high frequencies or microwave frequencies, and in the present invention these are believed to play an extremely important part in the behavior of the particles.

It is, therefore, a purpose of the invention to provide an environment for fusion reactions wherein a plasma of the monopolar, crossed-field neutralized type exists having a level of kinetic energies due to many-direction motions of the particles to give a probability of many potential fusion collisions before the average particle escapes to a region of lesser average energy.

To better understand the environment in which the invention is practiced, the two major loss mechanisms of plasmas which have been previously utilized to produce controlled fusion are set forth below. The first of the major loss mechanisms is that which is known as Bremsstrahlung radiation. Previous plasmas had electrons present in equal concentrations to the ions needed for the reaction, as this was the means for neutralizing the space-charge forces. These electrons, at high mean plasma energies, move much more rapidly than the ions and, therefore, electron-ion close approaches are much more common than ion-ion close approaches. The approach of an electron and an ion causes the electron to experience an extremely sharp deflection from the course of its movement, and in some cases it experiences a complete reversal. Such extreme acceleration of the electron produces electromagnetic radiation occurring in the ultraviolet or x-ray portions of the spectrum. As previously utilized plasmas operated at low gas densities, the plasmas are transparent to this radiation, which proceeds outward and is lost, being absorbed in the environent. The second major loss occurring in previously utilized plasmas also arises from the presence of the electrons. In the magnetic field used for confinement of the plasma, the electrons pursue circular or helical trajectories around the lines of magnetic flux. The electrons are subject to acceleration under this condition and generate electromagnetic radiation, most of which is lost to the plasma. From the above it will be apparent that the presence of the electrons in a combined ion and electron plasma causes major energy loss conditions.

In order to produce an environment wherein energy release from fusion reaction equals and begins to exceed the loss rate, it is proposed in the concept of the invention to produce the kinetic energy of the particles, ions in the case of a nuclear fusion process, in a neutralized plasma which is neutralized by a crossed-field condition, the plasma being simultaneously subjected to an electrical field and magnetic flux forces perpendicularly disposed to the electrical field. The concept of the invention requires that the plasmas employed be of a monopolar type wherein the loss mechanisms and the instability factors existing in previous plasmas, due to the presence of electrons in the electron-ion bearing plasmas, are eliminated.

In its most elementary form the invention consists of an evacuated vessel or envelope having a pair of spaced electrodes located therein. The space between the electrodes defines an interaction space for the plasma and the interaction of the plasma particles. A direct current potential is applied to the electrodes wherein one of the electrodes is imparted a positive polarity and the other electrode assumes a negative polarity. Electrical conductor coils usually outside the vacuum envelope, produce a magnetic field intermediate the electrodes which is substantially perpendicularly disposed to the electrical field resulting between the electrodes. Thus, a crossed-field condition occurs between the electrodes. In the case wherein nuclear fusion is to be created, a source of positive ions, such as stripped nuclei of deuterium and/or tritium is placed adjacent one end of the elongated interaction space or chamber defined by the electrodes, and a reaction chamber is in communication with the interaction space at a point remote from the ion sounce and is adapted to receive and utilize the activated plasma stream as it enters the reaction or utilization chamber.

The concept of the invention may also be utilized in similar apparatus wherein a source of like charged electrons, rather than ions are employed. When employing electrons, rather than ions, the apparatus of the invention is used to produce, amplify, modulate, or otherwise operate on or employ electrical energy at high frequencies, rather than to produce nuclear fusion energy.

BRIEF DESCRIPTION OF THE DRAWINGS

In the drawings:

FIG. 1 is a diagrammatic, elevational, sectional view of an elementary, linear, cross-field device in accord with the invention for producing an ion-constituted, monopolar, crossed-field-neutralized plasma, FIG. 2 is a diagrammatic view in elevational section, illustrating an elementary, linear, crossed-field device for producing an electron-constituted, monopolar, cross-field-neutralized plasma in accord with the invention, FIG. 5 is a perspective view of the apparatus of FIG. 1 or 2, illustrating the primary magnetic coil and a supplementary magnetic coil, and FIG. 6 is a diagrammatic transverse cross sectional view of the apparatus of FIG. 1 or 2 through the plasma stream illustrating the edge confinement electrodes.

DESCRIPTION OF THE PREFERRED EMBODIMENTS

Figure 4:
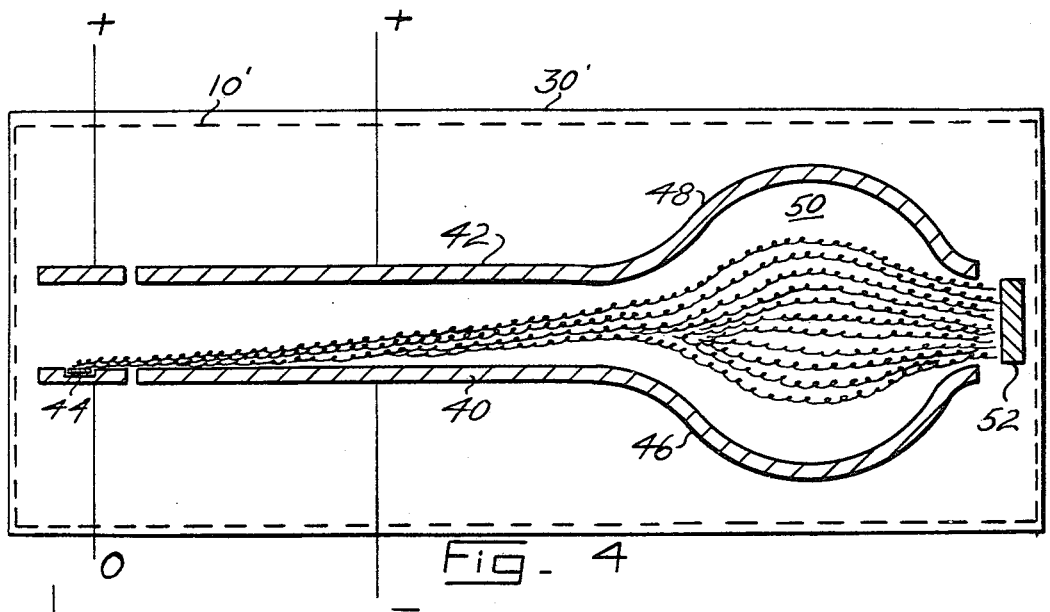
FIG. 4 is an elevational, diagrammatic view of a modification of apparatus in accord with the invention wherein a slow drift reaction chamber is defined by the electrodes.

A unique feature of the invention exists in the fact that the plasma employed is neutralized by the combined action of crossed, direct current, magnetic and electrical fields, rather than having the neutralization occur due to the presence of charged particles of opposite polarity, as is the usual situation, and simplified apparatus for producing the conditions necessary for the practice of the inventive concepts is shown in the drawings. With reference to FIG. 1, an evacuated, elongated vessel of nonmagnetic material is generally represented at 10 containing an elongated electrode 12 in opposed relationship to the electrode 14. Either or both of the electrodes 12 or 14 may be segmented as illustrated, where the electrodes are in three segments, to permit optimum adjustment of voltages on the different segments, and possibly also changes in the spacings between facing segments respectively of electrodes 12 and 14. At the left of FIG. 1, smaller opposed electrodes 16 and 18 are illustrated which constitute the launching region for the ions, and these electrodes are in alignment with, but electrically insulated from, the electrodes 12 and 14. The electrode 12 constitutes the positive electrode, or sole, and is connected to the positive side of a direct current supply. Electrode 14 constitutes the negative, or driver, electrode and is connected to the negative side of the direct current supply. The electrodes 12 and 14 define an interaction region or chamber within vessel 10 through which the monopolar plasma of the invention passes. An electrical conducting coil 30 is wound about the outside of vessel 10 and the electrodes to produce the magnetic field within the interaction chamber. The current flow through coil 30 is in the direction indicated by the arrowheads, and in FIG. 1, produces a magnetic field in the direction toward the viewer and perpendicular to the direction of the electric field between electrodes 12 and 14.

A utilization and stream-collecting region exists at the right end of the electrodes 12 and 14 defined by a reaction chamber 20, only partially illustrated, having an opening 22 communicating with the interaction chamber. Preferably, the reaction chamber 20 includes an electrode 24 and an electrode 26, and as chamber 20 lies within coil 30 a crossed-field also exists within the reaction chamber.

An ion source 32 is placed within the recess 34 defined in the electrode 16. This ion source, in the ion source block, must provide an adequate supply of positive ions, which may, for example, consist of ionized deuterium or tritium. The direct-current supply maintains the potential of the sole electrode at a value considerably more positive than that of the source block 16, and maintains the driver electrode at a potential much more negative than that of the source block. The potential of the negative-polarity roof electrode 18 is adjusted for maximum effectiveness of launching of the ion stream in a direction parallel to the surface of the ion source block 16. The direction of the electric field E is indicated by the arrow 36.

The ions from the ion source 32 move to the right, FIG. 1, away from the ion source locality in an approximately brillouin-type stream, the streaming or motion being substantially parallel to the ion-source surface and the electrode nonemitting surfaces that lie in substantially the same plane as the ion source and appear as a continuation thereof. As the ions move to the right, FIG. 1, between the electrodes 12 and 14, the effect of the electric field E will tend to cause the stream of ions to drift toward the driver electrode 14 as the ions move to the right. The direct-current space-charge forces on the ion particles tend to diverge the stream, but this is largely prevented by the combined actions of the applied direct-current electric and magnetic fields. More specifically, the combined force effect of the electric field due to the space charge and that due to the voltage applied to the electrodes 12 and 14 is to tend to move the ion particles in the direction away from the sole electrode 12. However, the magnitude of the magnetic field 35 is such that the magnetic force (velocity X magnetic flux density B) is equal and opposite to the combination of the electric field forces. The electric and the magnetic forces, thus, cancel one another. As the plasma stream moves to the right, the stream begins to acquire space-charge-wave attributes as it moves along and accepts energy from the direct-current electrical system by moving toward the driver electrode 14. In the space-charge-wave motion so acquired the stream particles have ordered rotational and also random motions which rapidly become much greater than the stream drift velocity which equals $E/B$. The longitudinal, plasma stream drift velocity remains at the value $E/B$ with E taking whatever value the potential structure may call for when the stream, which is now a true plasma, has moved significantly way from the ion source. The crossed-field neutralization of direct current space-charge forces persists even after the initial brillouin-type stream has become a plasma. However, the stream retains the drift velocity and, to a considerable extent, the charged content characteristic of the earlier near-brillouin-type flow.

Figure 3:
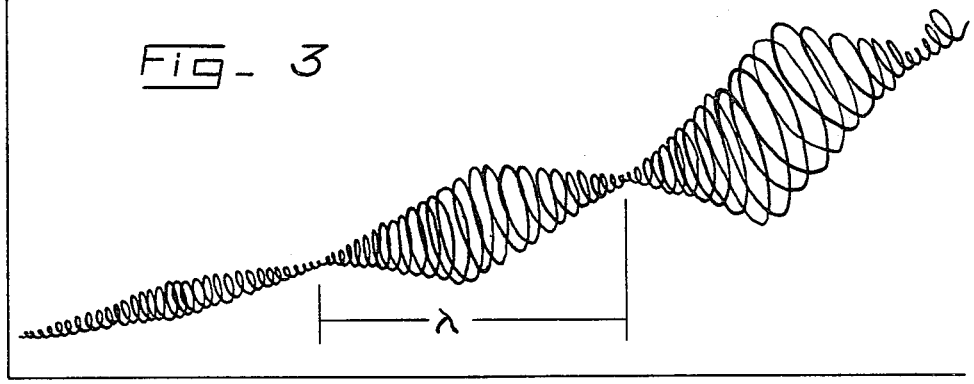
FIG. 3 is a diagrammatic view of a probable characteristic trajectory of an individual electron or ion of the growing space-charge-wave in a monopolar, crossed-field-neutralized plasma in accord with the invention.

In typical low-density plasmas there exist well-ordered, high-frequency, often high amplitude, oscillatory motions of the charge-transporting particles, corresponding to and being a primary cause of high-frequency "space-charge-wave" oscillating electric fields, having a "plasma frequency." In a monopolar plasma, these motions are rotational. There will now be described what is believed to be the nature of the space-charge wave in the plasma stream; however, the specific structure of the waves might have other forms which would produce essentially the same externally measurable effects. Space-charge waves in monopolar crossed-field interacting plasmas may be described as exhibiting an alternation, along the advancing wave, between kinetic energy content and electric field energy content. At the phase of greatest kinetic energy, the particle trajectories are in the nature of trochoids having large amplitude in almost completely overlapping loops, as illustrated in a schematic manner in FIG. 3. This makes the primary motions of the particles omnidirectional in the plane of the direct current electric field, and puts the entire energy content into these motions in this phase position. FIG. 3 shows what is believed to be the nature of the trajectory of an individual ion, or electron, illustrating the growing space-charge-wave in a monopolar, crossed-field-neutralized plasma. As the particle moves to the right, the loops defined thereby cyclically grow larger as the particle drifts away from the sole electrode, and this increasing of the radius of the loops contributes toward the divergence of the plasma stream as it moves through the interaction chamber. In the advancing frame of reference of the stream to the right, there are a great number of particles moving through similar trajectories which overlap in both the horizontal and vertical coordinates.

For the monopolar, electron-constituted plasma, the space-charge-wave oscillation have a frequency higher by about a factor $\sqrt{2}$ than the electron density frequency (sometimes called the plasma electron frequency). In a monopolar crossed-field neutralized ion-constituted plasma, a corresponding relationship of the space-charge-wave frequency exists to the ion density frequency that is also dependent upon the ion mass and density, being much lower than the electron density frequency. The space-charge-waves that carry the high particle kinetic energies are propagational in nature and can be spatially growing waves. These waves are essentially non-existent adjacent the particle source, but can have large amplitudes within short distances after entering the reaction space or chamber. The growth rate of the waves depends on the voltage between the driver and sole electrodes and its variation along the structure, wherein a varying electric field or magnetic flux is utilized and produced within the electrodes at various locations with respect to the particle source.

For net energy to be delivered to the particle stream from the direct current system, there must be a direct current flow. In the ion-constituted plasma, there must be an arrival of positive ions at, and delivery of their charges to, an electrode at a potential substantially negative relative to the ion source. For an electron-constituted, monopolar plasma there must be a flow of electrons to a collecting electrode at a potential substantially higher than the cathode's. The collection of electrons is expected to take place primarily on a collector electrode placed considerably downstream with respect to the cathode, although the electron collection may take place to some extent on portions of the driver electrode well downstream from the cathode. In either case the electrons, before collection, pass through the interaction region wherein oscillations and associated kinetic energies are generated. For the ion-constituted plasma, the delivery of charges to an electrode more negative than the ion source will presumably take place after the ion plasma stream has left the interaction chamber and entered the fusion chamber, or other output chamber.

In the nuclear fusion-producing application of the invention, the ion-constituted, monopolar plasma stream has at some point in its longitudinal travel through the interaction space acquired kinetic energy enough and a high enough rate of collision to cause a high rate of energy-releasing nuclear fusion collisions. When the rate of fusion-released energy equals or exceeds the various energy losses from the plasma, the plasma stream has become a self-sustaining source of heat energy and needs no further electrical energy input from the direct current electrical system. At this point, the plasma stream is passed by means of its slow $E/B$ drift velocity into the reaction chamber 20 wherein the sole function of magnetic and electric crossed-fields produced in the reaction chamber is to provide the confinement necessary for the reaction to continue.

FIG. 2 illustrates the elementary apparatus for producing and using an electron-constituted, monopolar crossed-field-neutralized plasma in accord with the invention. In this embodiment, the structure employed is substantially identical to that illustrated in FIG. 1, and like structural components are indicated by primes. However, in an electron-constituted system, the sole electrode 12' has a negative potential impressed thereupon and the drive electrode 14' forms an anode having a positive potential. The current in coil 30' is clockwise and the direction of magnetic forces will therefore be away from the viewer. The launching region electrode 16', in which the electron source is located, i.e., a cathode block 38, is maintained at zero volts. The launching region electrode 18' is impressed with a positive potential.

In the embodiment of FIG. 2, the collection chamber 20' is also provided with crossed-field electrodes 28 for confining the plasma, in this electron-constituted case a non-reacting but slowly advancing plasma, and this output chamber constitutes output structure for electronic circuit applications and collection of the energized electrons stream. For this purpose the electrodes 28 are in the form of a spacially periodic structure such as a ladder network or digital line circuit. This embodiment can be used as a generator for modulated radio-frequency power, for the storing of energy in the propagation stream with relatively slow propagation to an output point delivery, as a signal delay line because of the relatively slow nature of the $E/B$ velocity, and other electronic circuit uses. These possibilities of use of the monopolar plasma stream exist because the space-charge-wave motion is of an ordered nature, so that the energy it carries is recoverable in an electrical circuit.

In both the ion and electron constituted plasmas of FIGS. 1 and 2 it is desirable to use edge confining means to maintain the charged particles between the sole and driver electrodes. Such edge confinement may be provided by electrode strips 31 which extend parallel to electrodes 12 and 14, along the edges thereof, FIG. 6. The electrodes 31 are at a potential well above that of the sole electrode. For instance, the potential of the electrodes 31 may be as much above the potential of the sole electrode as the potential of the sole electrode is above the potential of the driver electrode, and the confinement forces will be as indicated by the dotted line arrows.

It will be appreciated that in the ion-constituted, nonopolar plasma stream, of FIG. 1, when subjected to adequately optimized treatment of details of adjustment of potentials along the negative or driver electrode 14, and of longitudinal potential gradients in the interaction space caused by variations in the electrode voltages and by variations in the geometric configuration, particularly in electrode spacing, the average kinetic energy of the ions is increased as they drift relatively slowly through the interaction chamber toward the reaction chamber 20. The potentials adequate for confinement are retained in the sole and driver electrodes. The movement of the ions continues to the point where the combination of kinetic energy and charged particle content becomes sufficient to initiate fusion reaction at a self-sustaining rate. At this point, the plasma enters the reaction chamber 20 wherein the heat generated by the reaction can be utilized in a useful manner, as for example by heating water or other medium to produce steam.

FIG. 5 illustrates the relationship of the coil 30 to the vessel 10, and it is desired that the coil be of a width greater than that of the vessel so that the magnetic field through the vessel will be substantially uniform. In FIG. 5 a supplementary coil 33 is illustrated adjacent the particle source end of the vessel and interaction chamber, an identical coil 33 being similarly located on the other side of vessel 10, which produce an extra strong magnetic field within selected portions of the vessel to provide a variable characteristic magnetic field for exercising control over the plasma and the particle movement. It will be understood that the supplementary coils 33 are only one way to vary the magnetic field, and other means and constructions known in the art may be utilized.

FIG. 4 illustrates a modification of electrode configuration wherein the main electrodes 40 and 42, at a point remote from the particle source 44, are outwardly formed as at 46 and 48, respectively, to define a chamber 50, which functions as a slowing, circulating or holding chamber for the purpose of self-reaction, or storage of energy, or for coupling out stored energy into an external electrical circuit. In FIG. 4, the particle collector is represented at 52. In the embodiment of FIG. 4, the electric field within the chamber 50 will be weak due to the wider spacing of the electrodes and, thus, a significant slowing movement of the plasma will occur within the chamber.

It may be useful to employ a substantially elongated output chamber or portion thereof, especially when there is to be coupling of the ordered energy of the stream into an electrical output system.

One of the difficult problems which has previously been unsolved in achieving control of large scale nuclear fusion pertains to the confining of the plasma stream in the region or channel in which it is feasible to increase its temperature to the self-sustaining reaction point, and have the plasma remain where it is needed for an adequate length of time for the initiation of such a self-sustaining reaction. Such confinement problems are minimized in the invention due to the existence of an arrangement wherein a monopolar cross-field-neutralized plasma is employed. The mechanical concepts of crossed-field confinement employed in the invention can be appreciated from the following:

When a strong direct-current electric field is present, crossed with a strong direct-current magnetic field, a positively charged particle cannot move toward the positive or sole boundary or electrode of its confinement or interaction space without giving up kinetic energy, in this case largely rotational energy, in exchange for potential energy. As the kinetic energy declines, the magnetic force decreases, permitting the electric field to force the particle back in the direction away from the more positive electrode. Conversely, a positively charged particle cannot approach the negative or driver electrode surface of its confinement or interaction space without gaining kinetic energy in exchange for potential energy. As its kinetic energy increases, the magnetic force increases, tending to force the particle back toward its equilibrium position. For a particle that has not moved far enough in the longitudinal stream flowing direction from its point of entry to have participated significantly in the growing space-charge-wave interaction, this equilibrium position is near to the equipotential corresponding to the potential of the ion source, FIG. 1. For the further downstream position, so that substantial conversion from potential to kinetic energy has occured, the equilibrium position has moved toward the driver electrode 14.

As any given group of particles advances as part of the plasma stream, its average kinetic energy rises substantially, as a result of the continuing interaction which involves acceptance of energy from the direct current potential source, with a corresponding delivery of energy into rotational kinetic energy of the particles and into the electric field energy of the space-charge-wave. Because of the overlapping nature of the rotational motions of the particles, and the exchanges between the kinetic energies of the particles and the electric field energy of the space-charge-wave, the spread of energies in the distribution will increase, roughly in proportion to the growth of the mean kinetic energy. Therefore, confinement of the particles in the high energy conditions that appear downstream will require larger spacing between the electrodes, and a correspondingly higher direct current voltage between them, than is called for near the ion or particle source. In the disclosed embodiments, it will be appreciated that the electric field or the magnetic field can be varied along the length of the electrodes 12 and 14 by using supplementary coils 33, for instance, and it is expected that the electrodes 12 and 14 will usually consist of a plurality of sections having various potentials.

To summarize the basic characteristics of a device in accord with the invention for producing controlled nuclear fusion, the following statements and examples are set forth:

Direct current electric power is the source of energy for initially raising the reactant kinetic energies high enough to initiate the fusion reaction. Externally applied power at a moderate power level is used to create the electric field from which the energy is derived to raise the reactants to mean energies adequate to initiate self-sustaining nuclear fusion reaction processes.

A very high magnetic flux density B is required for establishing the direct current magnetic field for the crossed-field. The ratio of the mass of a deuteron to that of an electron is 3673. Thus, magnetic flux densities in the range of 100,000 gauss to 200,000 gauss will be needed in the nuclear fusion application of the invention. While such a magnetic flux density is unusually high, the production of such a flux is within the range of current engineering design capabilities, using cryogenic technology and employing in the air-core electro-magnet coils wound either of sodium encased in stainless steel jacketing or one of the more recent superconducting alloys.

A growing space-charge-wave provides the high rotational kinetic energies that make possible collision rates adequate for nuclear fusion initiation. The self-generated high-frequency growing space-charge-wave in the interaction chamber exhibits the interaction that converts energy from the direct current power source into high, primarily rotational, kinetic energies in the fusionable reactants, causing at obtainable densities collision rates adequate for initiating nuclear fusion.

The dimensions of the apparatus used in accord with the invention are moderate, in that the length of the vessel 10 and the interaction region as defined by the electrodes 12 and 14 need not exceed a few feet. For a given power output or level, the size of the apparatus will be largely determined by the necessity for adequately removing the heat generated. The device is capable of steady operation and can be employed to operate continuously.

The crossed-field arrangement permits confinement of the plasma stream within the reacting region, and also permits confinement to the extent required in the reaction chamber. As no electrons exist in the ion-constituted plasma, the major source of radiation loss is removed. This is one of the very important advantages of the invention arising from the use of a monopolar plasma that employs deuterons and/or tritons, and the radiation loss due to acceleration of electrons is removed, which was previously present in prior plasmas.

It is conceivable that the ion-constituted plasma in accord with the invention could be used as a propulsion device for space vehicles wherein the ion stream is expelled from the apparatus into space and the reaction causes a propulsion of the space vehicle. However, the immediate use of the inventive concept with ion-constituted plasmas is considered to be that in producing a controlled nuclear fusion reaction, for whatever useful purposes may be derived therefrom.

In the electron-constituted embodiment of the invention, as shown in FIG. 2, the resultant activated plasma could have several uses, including serving as:

(a) A generator of high-frequency power by using a low velocity electron stream, the low velocity plasma stream being susceptible to modulation by varying electrode voltages, particularly the launching region electrode 18' or the voltages on segments of a segmented driver or sole electrode.

(b) A generator for generating R-F power at frequencies in the millimeter-wave range. By using very high values of the magnetic field strength, significant power levels could be generated.

(c) Means for introducing substantial and controlled time delay between the initiation of a signal process and its appearance elsewhere in a circuit.

(d) Means for putting high-frequency energy into short time storage in such a way that permits its delivery to occur at a substantially higher rate than it went into storage and, therefore, permitting generation of high-peak power pulses. Conversely, the energy can be delivered at a lower rate than it went into storage, permitting its delivery over a longer time and lower power level.

(e) An amplifier in which the input signal is the modulation voltage on the launching region electrode 18', which draws no conducting current, the output signal being contained in the modulation envelope of the space-charge-wave frequency signal.

By way of example, the following values of typical ion-constituted and electron-constituted plasmas in accord with the invention are given:

| | Plasma ion constituted (deuterons) | Plasma electron-constituted (electrons) |
|---|---|---|
| Electric field intensity | $1.8 \times 10^6$ | $1.8 \times 10^6$ volts/meter. |
| Magnetic flux density | 12 | .2 Webers/sq. meter. |
| | 120,000 | 2,000 gauss. |
| Drift velocity, E/B | $1.5 \times 10^5$ | $9 \times 10^6$ meters/second. |
| Space-charge-wave frequency | $132 \times 10^6$ | $7,900 \times 10^6$ cycles/second. |
| Wave length of space-charge-wave | 1.13 | 1.13 millimeters. |
| Radius of trochoid loop for 1,000 electron volts energy. | .53 | .53 millimeters. |

Only the basic concepts of the invention are set forth above, and it is appreciated that those skilled in the art will envision modifications and changes in the basic structure which lie within the scope of the inventive concept, and it is intended that the invention be defined only by the following claims.

We claim:
1. The method of confining a monopolar, cross-field, neutralized, ion-constituted plasma even at extremely high many-direction kinetic energies, whether rotational or random, and as existing by self-sustaining nuclear fusion in said plasma, comprising the steps of producing a direct current electric field between sole and driver electrodes, simultaneously producing a direct current magnetic field through said electric field and of a direction perpendicular with respect to said electric field, said monopolar plasma lying within said crossed direct current electric and magnetic fields which compels the plasma stream to lie in a laterally positioned layer region whose direct current potential is sufficiently high and low, respectively, relative to the laterally placed sole and driver electrodes as to make the collection of particles on either electrode so small as to represent an unimportant loss either of energy or particles from the stream, and simultaneously producing a slow drift of the plasma stream of a quasi-brillouin nature at right angles to the direction of the crossed direct current electric and magnetic fields.

2. The method of confining a monopolar, cross-field neutralized plasma as in claim 1 including the step of producing supplementary electric fields adjacent the edges of said sole and driver electrodes to provide edge confinement of said plasma.

3. Apparatus for the utilization of a monopolar, crossed-field-neutralized plasma in the generation of usable high kinetic particle energy for producing nuclear fusion comprising, in combination, an evacuated vessel, a pair of spaced electrodes within said vessel defining an interaction chamber, means charging said electrodes with opposite polarity to produce an electric field intermediate said electrodes, means producing a magnetic flux within said interaction chamber having lines of force transversely disposed to said electric field, a source of ion particles within said vessel introducing ion particles into said interaction chamber, said electric field and said magnetic flux being of such character as to produce a relative slowly moving monopolar flow along said interaction chamber in a direction at right angles to said crossed electric and magnetic fields, said flow being of a quasi-brillouin nature, and utilization means communicating with said interaction chamber remote from said source of ion particles receiving said particles upon energy being generated due to high kinetic energies being produced by said particles to produce nuclear fusion.

4. Apparatus for the generation of usable energy for producing nuclear fusion as in claim 3, wherein said utilization means comprises a chamber separate from said interaction chamber.

5. Apparatus for the generation of usable energy for producing nuclear fusion as in claim 3, wherein said electrodes each include a concave recess, said recesses being in opposed relation and mutually defining an enlarged chamber, said enlarged chamber constituting said utilization means.

6. Apparatus for the generation of usable energy for producing nuclear fusion as in claim 3, means for varying the magnetic field intensity along the length of said interaction chamber intermediate said source of particles of like charge and said utilization means.

7. Apparatus for the generation of usable energy for producing nuclear fusion as in claim 6 wherein said electrodes are segmented, and different potentials being imposed on said segments to vary the characteristics of said electric field in the direction of plasma flow.

8. The method of generating high ion particle kinetic energies to produce energy release by means of nuclear fusion, comprising the steps of producing within an evacuated vessel, a direct current electric field, and a direct current magnetic field having a strong component transverse to said direct current electric field, introducing a monopolar stream of positive ion particles having essentially no neutral gas particles present into said vessel and permitting said particles to pass through said crossed electric and magnetic fields, said fields being of such potential and magnitude with respect to each other that said stream of ion particles in flowing through said fields forms an ion-constituted, monopolar, crossed-field, neutralized plasma taking on quasi-brillouin flow characteristics, the flow being transverse to both fields, said electric and magnetic fields being of such character as to cause appearance of a space-charge-wave incorporating oscillatory, gyratory and random thermal motions greatly in excess of the forward motion used to convert direct current energy to ion particle kinetic energy, and utilizing the energy of such high kinetic energy ion particles to produce nuclear fusion.

References Cited

UNITED STATES PATENTS

| | | | |
|---|---|---|---|
| 3,025,429 | 3/1962 | Gow et al. | 176—9 X |
| 3,029,199 | 4/1962 | Baker et al. | 176—8 X |
| 3,120,475 | 2/1964 | Bennett | 176—5 |
| 3,189,523 | 6/1965 | Patrick | 176—8 X |
| 3,319,106 | 5/1967 | Hertz | 176—7 X |
| 3,265,583 | 8/1966 | Baker et al. | 176—7 |

OTHER REFERENCES

Controlled Thermonuclear Reactions by Samuel Glasstone et al., 1960, D. Van Nostrand Co., New York, pp. 430–435.

M. H. Miller, Study of High Temperature Electrons Originating in Streams Flowing in Crossed D-C Electric and Magnetic Fields, Univ. of Michigan Research Institute, Technical Report No. 26, July 1958, pp. 1–5, 213–217.

REUBEN EPSTEIN, Primary Examiner

U.S. Cl. X.R.

60—202; 176—5, 7; 313—161; 315—39.3, 111